(12) United States Patent
Maier

(10) Patent No.: US 10,703,185 B2
(45) Date of Patent: Jul. 7, 2020

(54) REAR CRASH MANAGEMENT SYSTEM (CMS)

(71) Applicant: THUNDER POWER ELECTRIC VEHICLE LIMITED, Ganzhou (CN)

(72) Inventor: Jens Maier, Milan (IT)

(73) Assignee: THUNDER POWER ELECTRIC VEHICLE LIMITED, Ganzhou (CN)

(*) Notice: Subject to any disclaimer, the term of this patent is extended or adjusted under 35 U.S.C. 154(b) by 33 days.

(21) Appl. No.: 15/697,366

(22) Filed: Sep. 6, 2017

(65) Prior Publication Data

US 2018/0065462 A1 Mar. 8, 2018

Related U.S. Application Data

(60) Provisional application No. 62/384,298, filed on Sep. 7, 2016.

(51) Int. Cl.

| | | |
|---|---|---|
| *B60K 1/04* | (2019.01) | |
| *B60R 19/34* | (2006.01) | |
| *B62D 25/08* | (2006.01) | |
| *B62D 29/00* | (2006.01) | |
| *B60L 50/60* | (2019.01) | |
| *B62D 21/15* | (2006.01) | |

(52) U.S. Cl.
CPC ............... *B60K 1/04* (2013.01); *B60L 50/66* (2019.02); *B60R 19/34* (2013.01); *B62D 21/152* (2013.01); *B62D 25/08* (2013.01); *B62D 29/008* (2013.01); *B62D 25/087* (2013.01)

(58) Field of Classification Search
CPC ............................ B62D 21/152; B60R 19/18
See application file for complete search history.

(56) References Cited

U.S. PATENT DOCUMENTS

| | | | |
|---|---|---|---|
| 4,165,113 A | * | 8/1979 | Casse ...................... B60R 19/18 188/268 |
| 5,727,826 A | | 3/1998 | Frank et al. |

(Continued)

FOREIGN PATENT DOCUMENTS

DE  102 39 919 A1  2/2004

OTHER PUBLICATIONS

Prottengeier et al., Car bumper comprises extruded hollow profile with mountings for attaching it to car, top and bottom walls having longitudinal ribs or grooves, Feb. 26, 2004, EPO, DE 102 39 919 A1, Machine Translation of Description (Year: 2004).*

(Continued)

*Primary Examiner* — James A English
(74) *Attorney, Agent, or Firm* — Kilpatrick Townsend & Stockton, LLP

(57) ABSTRACT

A rear impact system for an electric vehicle, the rear impact system includes a rear crash element extending laterally along a rear of the electric vehicle. The rear crash element defines an interior having a number of ribs extending between a front surface and a rear surface of the rear crash element. The system includes a left crash beam coupled between a rear portion of a rear wheel arch of the electric vehicle and the rear crash element of the electric vehicle and a right crash beam coupled between the rear portion of the rear wheel arch and the rear crash element of the electric vehicle.

20 Claims, 10 Drawing Sheets

(56) References Cited

U.S. PATENT DOCUMENTS

| | | | | |
|---|---|---|---|---|
| 8,511,745 B2* | 8/2013 | Baldwin | ................ | B60R 19/34 |
| | | | | 188/374 |
| 2012/0169089 A1* | 7/2012 | Rawlinson | ........... | B62D 25/087 |
| | | | | 296/193.08 |
| 2013/0088044 A1* | 4/2013 | Charbonneau | ....... | B62D 21/157 |
| | | | | 296/187.12 |
| 2013/0249243 A1 | 9/2013 | Lee et al. | | |
| 2014/0292007 A1* | 10/2014 | Kawamata | .............. | B60R 19/34 |
| | | | | 293/133 |
| 2014/0300126 A1* | 10/2014 | Ehrlich | .................. | B62D 27/02 |
| | | | | 296/29 |
| 2017/0136970 A1* | 5/2017 | Steinebach | ............. | B60R 19/18 |
| 2018/0281710 A1* | 10/2018 | Lindblom | ............... | B60R 19/18 |

OTHER PUBLICATIONS

European Search Report for EP 17189994 dated Dec. 8, 2017, all pages.

* cited by examiner

REAR CRASH MANAGEMENT SYSTEM (CMS)

CROSS-REFERENCE TO RELATED APPLICATION

The present application claims the benefit of U.S. Provisional Application No. 62/384,298, filed Sep. 7, 2016, the entire contents of which are hereby incorporated by reference for all purposes.

BACKGROUND OF THE INVENTION

There are many problems unique to electric vehicles, oftentimes due to the presence of large and/or numerous batteries used to power the electric motor and other components of the vehicle. These batteries are often bulky, and add significant weight to the vehicles. These considerations present challenges in designing a particularly efficient and practical electrical vehicle. Additionally, these batteries may be particularly susceptible to damage during a collision. Damage to a battery may be especially dangerous by presenting a fire and/or corrosive hazard. As such, protecting the batteries from damage remains a difficult challenge unique to the field of electric vehicles.

Vehicle manufacturers have added a number of new structural features to vehicles to improve safety and/or performance. Many of these structural features are applicable to electric, hybrid, and non-electric vehicles equally, while others place a greater emphasis on the vehicle motor type, such as a vehicle base plate with increased thickness for protecting an electric car battery over a specific region of the vehicle. Structural improvements that increase either safety or performance without a significant compromise of the other remain important objectives of vehicle manufacturers.

Electric vehicles are becoming an increasingly viable alternative to traditional vehicles with internal combustion engines. Electric vehicles may have advantages in their compactness, simplicity of design, and in being potentially more environmentally friendly depending on the means by which the electricity used in the vehicle was originally generated. The prospect of using renewable energy sources to power automobiles in place of gasoline has obvious advantages as oil reserves across the globe become increasingly depleted.

BRIEF SUMMARY OF THE INVENTION

In one aspect, a rear impact system for an electric vehicle is provided. The rear impact system may include a rear crash element extending laterally along a rear of the electric vehicle. The rear crash element may define an interior comprising a plurality of ribs extending between a front surface and a rear surface of the rear crash element. The rear impact system may also include a left crash beam coupled between a rear portion of a rear wheel arch of the electric vehicle and the rear crash element of the electric vehicle and a right crash beam coupled between the rear portion of the rear wheel arch and the rear crash element of the electric vehicle.

In another aspect, a rear impact system for an electric vehicle may include a rear crash element extending laterally along a rear of the electric vehicle. The rear crash element may include a right surface, a left surface, a front surface, and a rear surface that define an interior having a plurality of ribs extending between a front surface and a rear surface of the rear crash element. The top surface and the bottom surface may have different widths. The rear impact system may also include a left crash beam coupled between a rear portion of a rear wheel arch of the electric vehicle and the rear crash element of the electric vehicle and a right crash beam coupled between the rear portion of the rear wheel arch and the rear crash element of the electric vehicle.

In another aspect, a method of absorbing a rear impact with an electric vehicle is provided. The method may include receiving a collision at a rear end of the electric vehicle and absorbing force using a plurality of ribs of a rear crash element of the electric vehicle. The rear crash element may define an interior comprising the plurality of ribs. Each of the plurality of ribs may extend between a front surface and a rear surface of the rear crash element. The method may also include transferring force from a rear edge of the rear crash element to at least one crash beam that is coupled with a front edge of the rear crash element and transferring a force from the collision from a rear edge of the at least one crash beam to a medial portion of the at least one crash beam. The at least one crash beam may be coupled with a rear portion of a rear wheel arch of the electric vehicle and extending to the rear end of the electric vehicle. The method may further include transferring any remaining portion of the force to the rear end of the rear wheel arch.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The systems and methods described herein relate generally to improvements for electric vehicles. Due to the size and weight considerations of the batteries required to power such vehicles, as well as the need to make electric vehicles as safe as possible, each component within the electric vehicles must be designed with particular characteristics in mind. Specifically, considerations related to the weight and structural integrity of each component must be weighed to ensure that the electric vehicles are both efficient and safe to operate. For example, the body of the vehicle must be stiff, efficient, and lightweight. A lightweight body helps counteract the additional weight of the batteries, which may be in the form of several large batteries, or numerous (sometimes thousands) of smaller batteries wired together. The stiff body helps make the vehicle more stable during cornering and also helps limit damage to the body and batteries during a collision. Protection of the batteries during a collision is particular important, as the large number of batteries pose a significant fire hazard and may also expose passengers and others to highly corrosive material. Due to this high safety risk, it is imperative that the body structure be designed to withstand high force collisions from any direction.

Figure 1:
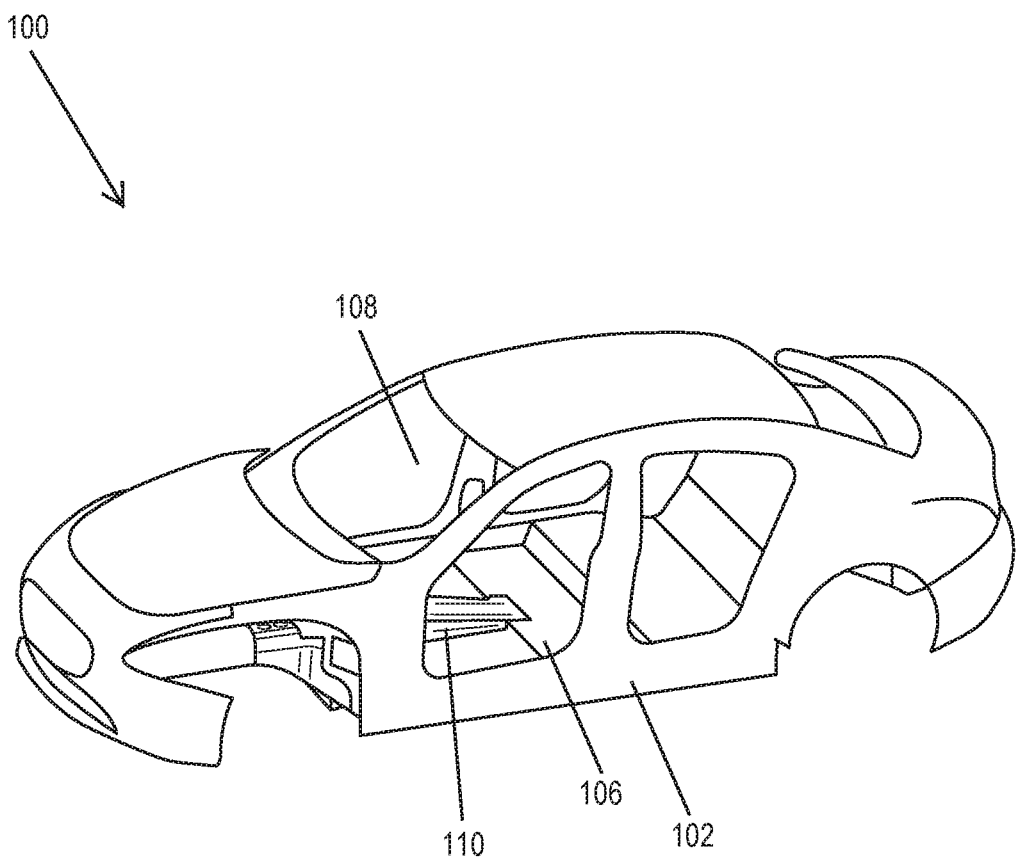
FIG. 1 depicts an electric vehicle according to embodiments.

Turning now to FIG. 1, one embodiment of an electric vehicle 100 is shown. While shown here as an electric automobile, electric vehicle 100 may be any motorized vehicle that is powered by electricity. For example, electric vehicle 100 may include vehicles such as cars, buses, trains, trucks, trams, watercraft, aircraft, and/or any other type of transportation mechanism.

Here, much of the main body 102 of the electric vehicle 100, especially those components designed to form the skeleton of the vehicle and those components used for collision protection, are made of aluminum or alloys containing aluminum, although it will be appreciated that other materials may be considered. Aluminum alloys provide strong, yet lightweight components that help shed weight to compensate for the high weight of the batteries necessary to power the electric vehicle. For electric vehicles, an increased emphasis is placed on protection of the batteries as damage to battery cells can cause explosion and fires within the vehicle. Such problems are compounded due to the large amount of space batteries must occupy within electric vehicles in order to maintain practical driving ranges. Therefore, vehicle alterations that provide increased protection along edges and corners of the vehicle battery are advantageous. Such alterations may include considerations related to, but not limited to providing: (1) increased rigidity of the vehicle, (2) increased absorption of energy from a collision, and (3) increased efficiency of transfer of energy/force stemming from an impact to the vehicle's body to lessen the potential impact applied to the vehicle battery and to passengers in the vehicle.

Battery elements 104 (shown in FIG. 2) are positioned underneath a floor structure 106 of the electric vehicle 100. Such positioning provides several benefits. First, the battery elements are isolated from the passenger compartment, largely by an aluminum (or other metallic material) floor structure 106, which helps increase passenger safety. The placement of the battery elements 104 underneath the vehicle 100 also allows the battery elements 104 to be connected to electrical systems of the vehicle 100 from underneath the floor structure 106. This enables the battery elements 104 to be changed out from the exterior of the vehicle 100. For example, the vehicle 100 may be raised up and the battery elements 104 may be decoupled from the underside of the vehicle 100. As just one example, a number of bolts or other fasteners may be removed and the battery elements 104 may be lowered from the vehicle 100. The battery elements 104 may be disconnected and new battery elements 104 may be connected and fastened to the underside of the vehicle 100. This allows old batteries to be replaced easily, and also enables a quick swap of depleted battery elements 104 for charged battery elements 104, serving as a method of rapidly charging the vehicle 100 for longer trips. The placement of the battery elements 104 also places much of the weight of the vehicle 100 near the ground, thus lowering the center of gravity of the vehicle 100, which allows the vehicle 100 to corner better and reduces the odds of a rollover.

Unlike automobiles that utilize internal combustion engines and include drivetrains that extend along a length of the vehicle, electric vehicle 100 is driven by one or more electric motors positioned near the wheel axles. As a result, there is no need for a longitudinal drive train. To help isolate a passenger compartment 108 from the battery elements 104 while providing access for connections of the battery elements 104 to be connected to electric systems within the passenger compartment 108 and to the one or more electric motors, the passenger compartment may be provided with a rigid tunnel 110 protruding upward from a floor structure 106 of the passenger compartment 108. However, unlike in conventional gas-powered vehicles where a tunnel may be provided to provide clearance for a drivetrain, rigid tunnel 110 is included to provide clearance for a portion of the battery elements 104 used to supply power to the electric vehicle 100. The rigid tunnel 110 may not only provide a housing for a portion of the battery assembly, but may serve a number of other functions. As just one example, the rigid tunnel 110 may help absorb and transfer force away from passengers in the event of a collision. In such embodiments, the rigid tunnel 110 may be formed of carbon fiber or another composite material that is extremely strong and lightweight. In other embodiments, the rigid tunnel 110 may serve as part of an air ventilation system, with hot or cold air being vented to the passenger compartment 108 through a portion of the rigid tunnel 110.

Figure 2:
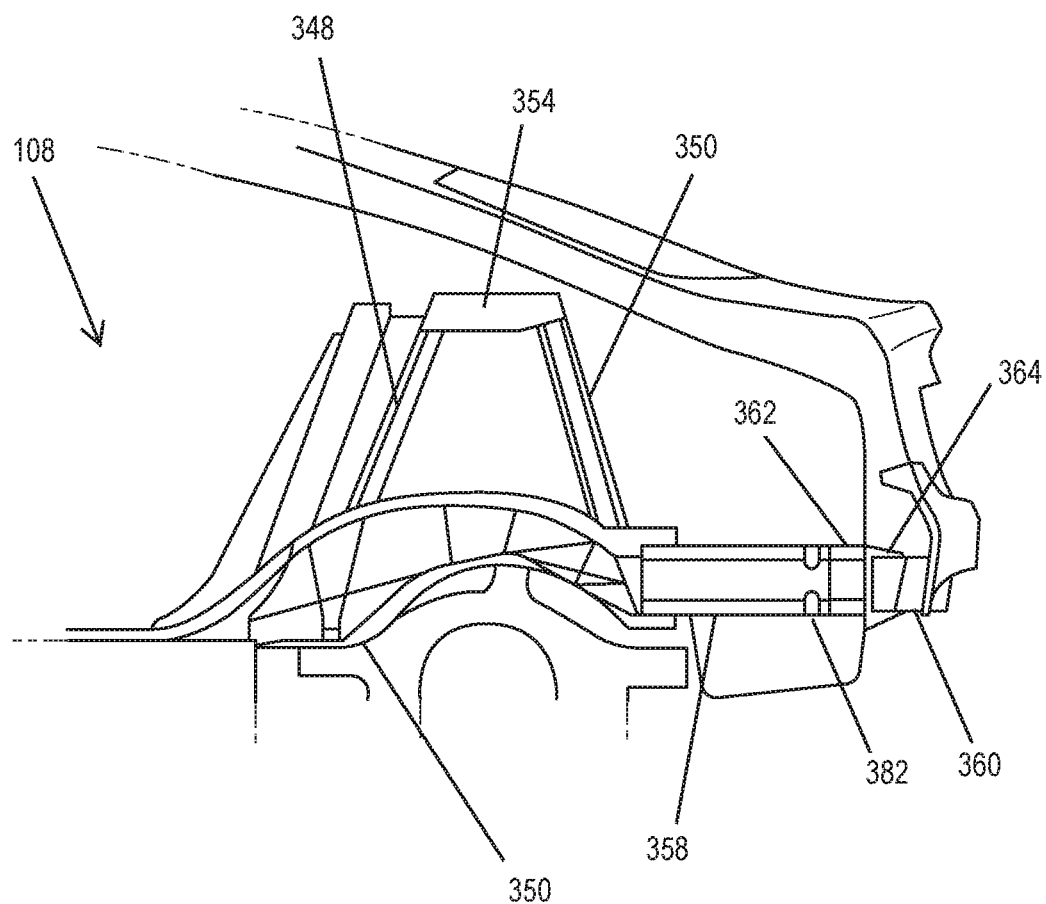
FIG. 2 depicts a rear shock tower of an electric vehicle according to embodiments.

FIG. 2 depicts a rear shock tower of the electric vehicle 100. The rear shock tower may include a front tower support 348 positioned over a front portion of a rear wheel arch 350 of the electric vehicle 100. The front tower support 348 is angled toward a rear of the electric vehicle 100 from a lower portion to an upper portion of the front tower support 348. In some embodiments, the front tower support 348 may define a rear wall of the passenger compartment 108. For example, the front tower support may be a support beam that is coupled with a rear seat back and that serves as a support to maintain a position of the rear seat assembly. The rear shock tower may also include a rear tower support 352 positioned over a rear portion of the rear wheel arch 350. The rear tower support 352 may be angled toward a front of the electric vehicle 100 from a lower portion to an upper portion of the rear tower support 352 such that tops of the front tower support 348 and the rear tower support 352 are angled toward one another. Top ends of the front tower support 348 and the rear tower support 352 may be coupled together using a tower bridge 354. Tower bridge 354 spans a distance between the upper end of the front tower support 348 and the upper end of the rear tower support 352. In some embodiments, the lower ends of both the front tower support 348 and the rear tower support 352 are coupled with the rear wheel arch 350. For example, the lower portion of the front tower support 348 and the lower portion of the rear tower support 352 are coupled with a top surface of the rear wheel arch 350 using a plurality of fasteners extending through exclusions formed in the lower portion of the front tower support 348 and the lower portion of the rear tower support 352.

Vehicle 100 may have a rear shock tower positioned over each rear well arch 350. These shock towers may be coupled with one another, such as by a cross beam 356 that extends between the tower bridges 354 of the two shock towers. The primary purpose of each shock tower is to provide a securement site for a mounting of the rear suspension and axle. For example, each tower bridge 354 may be configured to receive and secure a mounting of the suspension, such as a shock absorber. The rear shock towers also provide force transfer mechanisms to help the vehicle handle bumps while driving. For example, the shock towers may disperse forces through one another via the connection through the connecting cross beam. The rear shock towers may also disperse some of the force to wheel arches 350 and the rest of the chassis 292 via front tower support 348 and rear tower support 352. The connection between the suspension and the rear shock towers allows for movement of the wheel of vehicle 100 upward toward rear wheel arch 350 during the absorption of bumps and dips in the road.

The rear shock tower may be generally trapezoidal in shape, with a top of the trapezoidal shape defined by the tower bridge 354, sides of the trapezoidal shape defined by the front tower support 348 and the rear tower support 352, and a base of the trapezoidal shape defined by the rear wheel arch 350. In some embodiments, additional angular support beams may be included to form a truss structure within the trapezoidal shape to provide additional strength to the rear shock tower.

The rear shock tower may be configured to absorb and transfer force in a manner to protect the battery elements 104 and/or the passenger compartment 108 in the event of bumps and/or dips encountered by the vehicle 100. To aid in the absorption of force, the components of the rear shock tower may be formed of aluminum or aluminum alloys. The use of aluminum, rather than a more rigid material such as steel, not only reduces the weight of the vehicle 100, but also allows more of the energy from bumps and/or dips to be absorbed. To further stiffen the rear crash towers and to aid in handling larger forces, each of the front tower support 348 and the rear tower support 352 defines an interior having a number of ribs extending along a length of the respective support. The ribs may extend through the entire interior to couple multiple walls of the support together, thus providing additional material and material thickness to absorb and transfer greater forces. For example, the front tower support 348 and the rear tower support 352 may each include one or more ribs extending from the front wall to a rear wall. To facilitate the formation of the ribs, the front tower support 348 and rear tower support 352 may be extruded from aluminum such that the ribs are formed along with the outer walls of the respective tower support. In some embodiments, connection points between the ribs and the outer walls of the tower support may taper outward such that a thickness near the connection point is greater than a thickness of the rest of the ribs. Similarly, junctions of the ribs one another may also have greater thicknesses than the rest of the ribs. Due to its more complex and non-uniform structure, the tower bridge 354 may be formed of pressed or cast aluminum. The rear wheel arches 350 may also be formed of pressed or cast aluminum or steel to allow for the production of an intricate rib structure within the rear wheel arches 350 to add additional strength and rigidity.

In some embodiments, the rear shock tower may include a metallic sheet (not shown) positioned between the front tower support 348, the rear tower support 352, and the tower bridge 354 so as to close an opening formed between the components. The metallic sheet may include one or more embossed portions, ribs, and/or other profiles extending along a length and/or formed within a face of the metallic sheet. Such formations increase the stiffness of the metallic sheet.

Each rear wheel arch 350 may be coupled with a rear crash system of the vehicle 100. For example, each rear wheel arch 350 may be coupled with the rear crash beam 358 of the electric vehicle 100. For example, the rear wheel arch 350 may define a receptacle and/or flange that is configured to receive a front end of the rear crash beam 358. The rear crash beam 358 may be bolted, welded, and/or otherwise secured within the rear wheel arch 350, such as by fastening an outer surface of the rear crash beam 358 to an interior surface of the rear wheel arch 350. The rear crash beams 358 may extend rearward toward a bumper 360 of the electric vehicle 100. The rear crash beams 358 may be coupled with the bumper 360 via one or more intervening components. For example, each rear crash beam 358 may be coupled with a bumper mount 362. This may be done my inserting a rear end of the rear crash beam 358 into a receptacle, flange, and/or bracket of the bumper mount 362. In other embodiments, the rear crash beam 358 may be positioned such that a rear end of the rear crash beam 358 abuts a front edge of the bumper mount 362, with a securement mechanism being used to couple the component ends together. In some embodiments, the bumper mount 362 may be coupled with a rear crash element 364, which is in turn coupled with the bumper 360. In some embodiments, the rear crash beam 358 may define a number of dimples 382. Dimples 382 help initiate an accordion-like crumpling of the rear crash beam 358 in the event of a rear collision. For example, upon impact, a rear edge of the rear crash beam 358 may be forced toward the dimples 382. The dimples 382 allow the rear edge to be more easily pushed directly toward the main beam 358 such that the beam 358 crumples largely along its longitudinal axis (rather than at an angle relative to the axis), thus absorbing a maximum amount of force.

Figure 3:
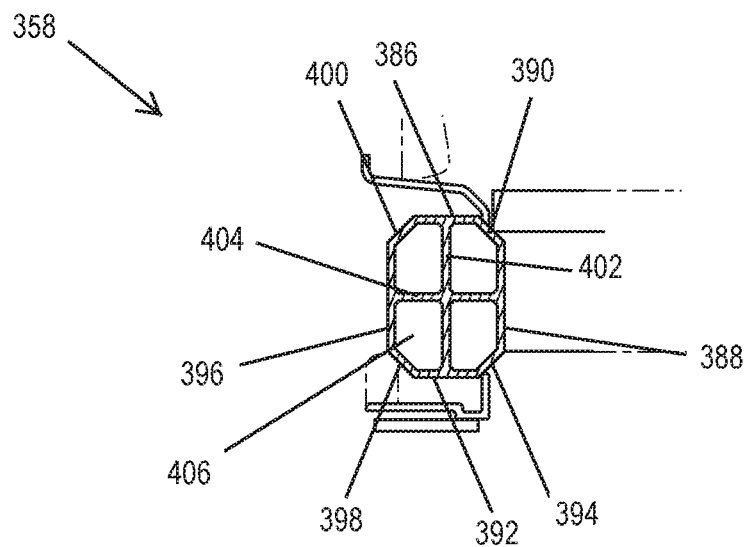
FIG. 3 depicts a rear view of a rear impact system according to embodiments.

FIG. 3 depicts a rear impact system of the electric vehicle 100. The system may include at least one longitudinal crash beam 358. For example, a left longitudinal beam 358 may be coupled with a rear portion of a chassis 292 or rear wheel arch 350 of the electric vehicle 100 and may extend to a rear bumper 360 of the electric vehicle 100, possibly with one or more intervening components such as bumper mounting 362 and/or crash element 364. A right longitudinal beam 358 may be coupled with the rear portion of the wheel arch 350 and may extend to the rear bumper 360. The longitudinal crash beams 358 may be bolted, welded, and/or otherwise fastened to the rear wheel arch 350 and/or bumper mounting 362. The longitudinal beams 358 may also be coupled with one or more components of the vehicle 100. For example, a side of the longitudinal beams 112 may be coupled with one or more body members of the vehicle 100 and/or other structural elements such as those defining a motor compartment and/or trunk. Oftentimes, the right and left longitudinal crash beams 358 are spaced apart along a rear of the vehicle 100. For example, the right and left longitudinal crash beams 358 may be separated by a trunk and/or a motor housing. The longitudinal crash beams 358 may be configured to absorb and transfer force in a manner to protect the battery elements 104 and the passenger compartment 108. For example, the right and left longitudinal crash beams 358 may each be formed of aluminum or aluminum alloys.

The use of aluminum, rather than a more rigid material such as steel, not only reduces the weight of the vehicle 100, but also allows more of the energy from a collision to be absorbed, such as by designing the aluminum longitudinal crash beams 358 to crumple in an accordion-like manner. Such crumpling may be achieved using several design features. For example, dimples 382 may provide some clearance to allow an impacted portion of the beam 358 to compact against a more inward portion of the beam 358 opposite the dimple 382. This allows the beam 358 to crumple largely along its longitudinal axis to absorb a greatest amount of force possible, and possibly significantly more force than crumping at an angle relative to the longitudinal axis. Dimples 382 are offset from an end of the beam 358 such that they are disposed slightly inward of the rear end of the beam 358. Dimples 382 are typically formed at corners of the profile of each beam 358 such that each of the dimples is formed in two side walls of the longitudinal crash beam 358. While it is possible to create one indentation around all or a substantial portion of the outer periphery of the beams 358, this may result in the beam 358 being able to handle smaller forces before it crumples, yields, or otherwise deforms.

The desired crumpling may also be aided by outer walls of the right and left longitudinal crash beams 358 being chamfered and/or the walls being generally octagonal in shape. At just one example, an outer periphery of each of the right and left longitudinal crash beams 358 may include a top wall 386 coupled with a first side wall 388 by a first diagonal wall 390. A bottom wall 392 may be coupled with the first side wall 388 by a second diagonal wall 394. A second side wall 396 may be coupled with the bottom wall 392 by a third diagonal wall 398. A fourth diagonal wall 400 may be provided that couples the second side wall 396 with the top wall 386. In some embodiments, the longitudinal beams 358 may have a height greater than its width. For example, a height the longitudinal beams 358 may be between 1.25 and 2 times greater than its width. This may be achieved, for example, by the first side wall 388 and the second side wall 396 being between about 1.5 to 2.5 times as long as the top wall 386 and the bottom wall 392.

To aid in handling larger forces without adding unnecessary weight, each of the left longitudinal beam and the right longitudinal beam 358 defines an interior comprising a plurality of ribs extending along a length of the right and left longitudinal crash beams 358. The ribs may extend through the entire interior to couple multiple walls together, thus providing additional material and material thickness to absorb and transfer greater forces. For example, the right and left longitudinal crash beams 358 may each include a vertical rib 402 extending from the top wall 386 to a bottom wall 392 and a horizontal rib 404 extending from the first side wall 388 to the second side wall 396. In other words, rib 402 extends from a center of the top wall 386 to a center of the bottom wall 392 and rib 404 extends from a center of the first side wall 388 to a center of the second side wall 396. Spaces 406 defined by an area between the outer walls of each of the left longitudinal beam and the right longitudinal beams 358 and the ribs 402 and 404 are pentagonal in shape. To facilitate the formation of the ribs 402 and 404, the left and the right longitudinal beam 358 may be extruded from aluminum such that the ribs 402 and 404 are formed along with the outer walls of the longitudinal beams 358. In some embodiments, connection points between the ribs 402 and 404 and the outer walls of the longitudinal beams 358 may taper outward such that a thickness near the connection point is greater than a thickness of the rest of the ribs 402 and 404. Similarly, junctions of the ribs 402 and 404 with one another may also have greater thicknesses than the rest of the ribs 402 and 404.

Figure 4:
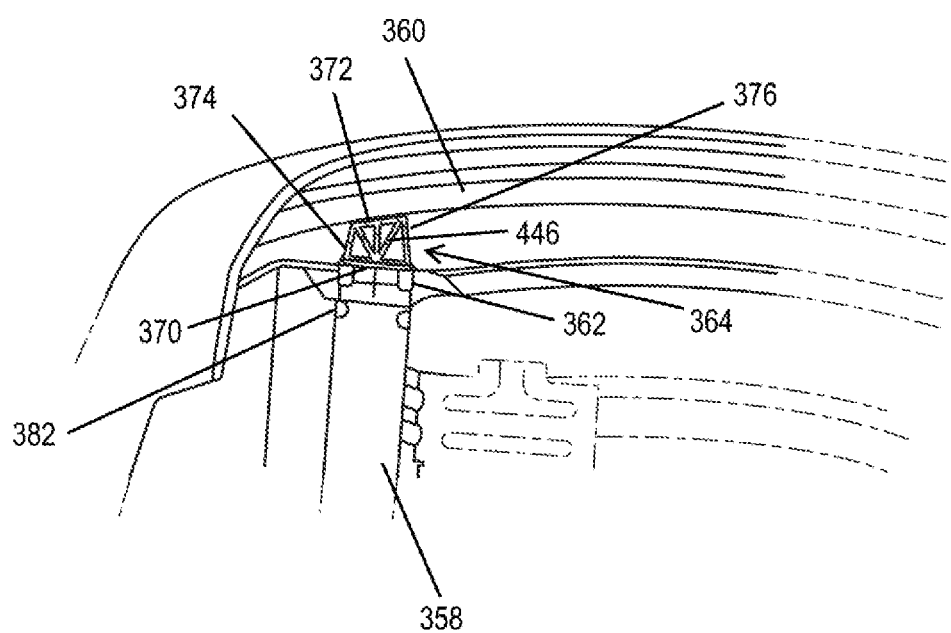
FIG. 4 depicts a bottom view of a rear impact system according to embodiments.

FIG. 4 shows a bottom view of a rear impact system of vehicle 100. Here, crash beam 358 is coupled with bumper mount 362. Here, bumper mount is shown being secured to the crash beam 358 by having a chamber in which a rear end of crash beam 358 is inserted. Bumper mount 362 provides an interface for coupling the rash beam 358 with rear crash element 364. For example, bumper mount 362 may include a flange or other interface that defines apertures for inserting bolts or other fasteners. Fasteners may be inserted in these apertures and extend into an interior of the crash element 364 to secure the crash element 364 with the bumper mount 362 and crash beam 358. Crash element 364 may provide an interface between the bumper mount 362 and bumper 360, as well as include design characteristics that improve the performance of the vehicle 100 in the event of a rear impact. For example, the crash element 364 may have a flat front surface 370 that is configured to sit flush against a rear surface of bumper mount 362. The crash element 364 may have a rear surface 372 that is sloped relative to the front surface to allow the crash element 364 to be mounted flush against a curved inner surface of bumper 360. In some embodiments, side walls 374, 376 of the crash element 364 may be tapered inward from front to back. This allows a smaller connection at the bumper 360, while ensuring a larger contact area with the bumper mount 362 to help spread out forces from rear impacts. Crash element 364 may define an open interior having a number of ribs 446 disposed therein. For example, the interior may include three ribs 446 that extend from a central portion of the front surface 370 to various positions on the rear surface 372 to form a triangular truss system within the crash element 364. Here, two ribs 446 extend to rear corners of the crash element 364 while a third rib 446 extends to a center portion of the rear surface 372. The truss system helps greatly increase the strength and rigidity of the crash element 364 while minimizing weight and material costs. Here, ribs 446 extend upward in a z-direction, unlike most ribs that extend in the x or y-directions. This design ensures the ribs 446 are connected to and reinforce the front surface and back surface of the crash element 364. While shown with open top and bottom ends, it will be appreciated that the crash element 364 may be a closed structure. It will be further appreciated that crash element 364 may also include chamfered corners and/or dimples to help the crash element 364 deform in a desired manner in the event of a rear impact.

It will be noted that dimples 382 are provided at different distances from the bumper mount 362. This may be done to help compensate for the curvature of the bumper 360 and the rear of the vehicle 100. By slightly staggering the dimples 382 along a length of the beam 358, the beam 358 may be encouraged to crumple along its longitudinal axis, even in the event of off-center impacts. It will be appreciated that dimples 382 may be positioned parallel with one another or in other configurations to achieve the desired collision characteristics for a particular bumper design.

Figure 5:
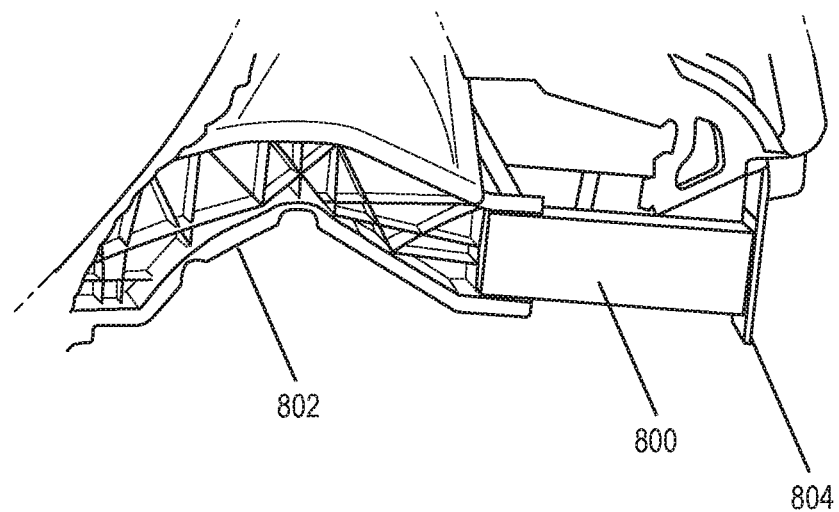
FIG. 5 depicts a side view of a rear impact system according to embodiments.
Figure 6:
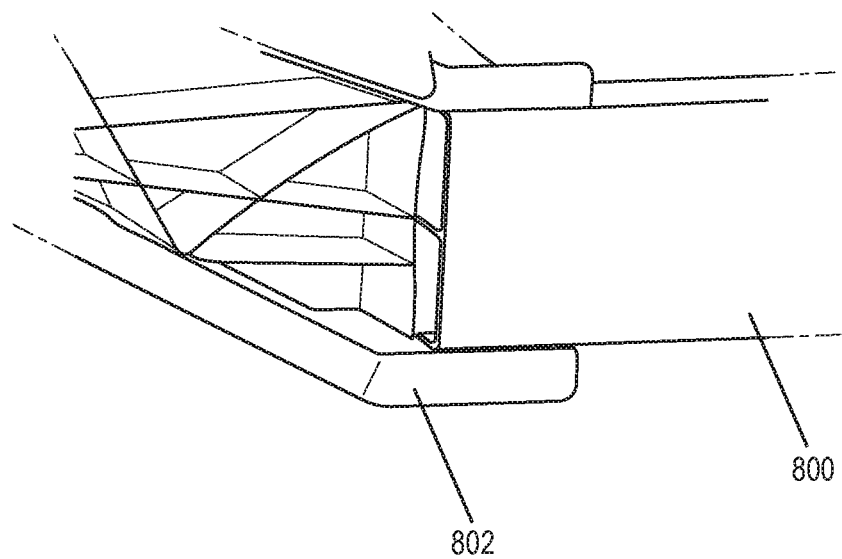
FIG. 6 depicts a side view of a coupling between a rear wheel arch and a rear crash beam according to embodiments.
Figure 7:
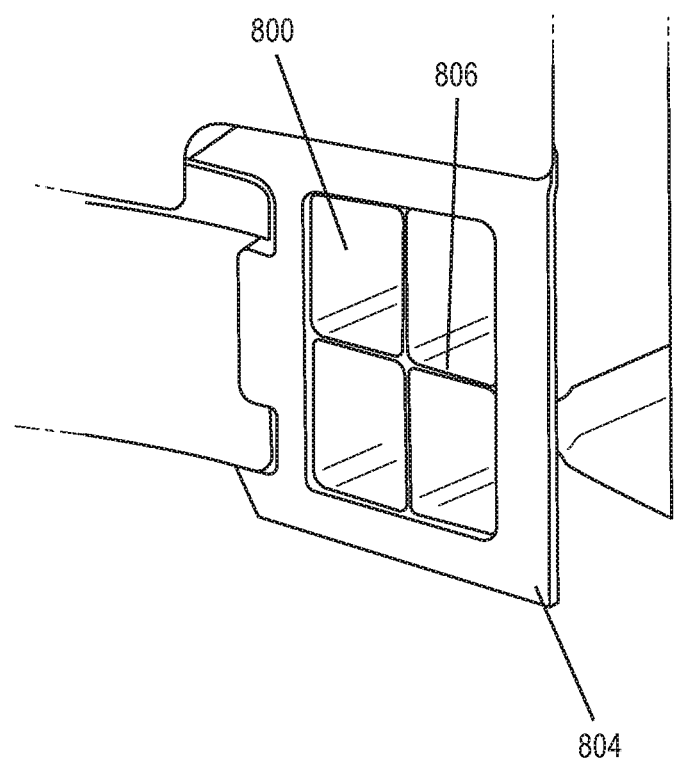
FIG. 7 depicts a rear isometric view of a bumper mounting according to embodiments.
Figure 8:
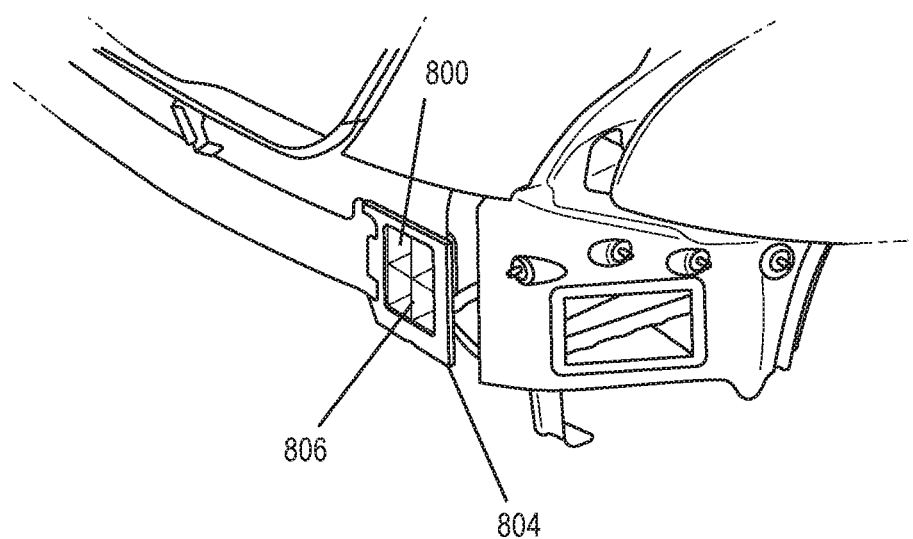
FIG. 8 depicts a rear isometric view of a rear impact system according to embodiments.

FIGS. 5-8 depict an alternative embodiment of a rear impact system of vehicle 100. The rear impact system is largely similar to that described elsewhere herein and may include the same or similar features and benefits. Here, a crash beam 800 having a generally rectangular cross sectional profile may be coupled with a wheel arch 802 and may extend rearward to a flat bumper mount 804 as shown in FIG. 5. Wheel arch 802 includes an intricate truss or other reinforcement system that includes a number of reinforcement struts extending between an inner arch and an outer arch of the wheel arch 802. As shown in FIG. 6, several of these struts are positioned to support a front edge of the beam 800 to ensure that the coupling between the wheel arch 802 and beam 800 is sufficiently strong. A rear end of the longitudinal crash beam 800 is coupled with a flat bumper mount 804 as shown in FIG. 7. Beam 800 is shown having a generally rectangular cross-sectional profile, although in some embodiments, one or more of the sides may be positioned at irregular angles relative to one another. For example, a top side may be angled upward by having the left and right sides be of different lengths. In some embodiments, the beam 800 may include chamfered corners and/or dimples as described in accordance with beam 358. Outer walls of beam 800 may define an open interior that contains a number of ribs 806. Ribs 806 may be similar to those described above, and may connect multiple surfaces of the beam 800 together within the interior of beam 800. For example, a horizontal rib 806 and a vertical rib 806 may bisect the interior of beam 800, thereby creating four generally rectangular chambers that extend along a length of the beam 800. It will be appreciated that other rib designs may be contemplated, with the main purpose of the beams being to add strength and rigidity while eliminating the weight associated with solid beams. Bracket mount 804 is shown here as a generally flat plate that may be mounted to a flat rear end of the beam 800. As shown in FIG. 8, bumper mount 804 provides a flat mounting surface on which a crash element and/or bumper, such as crash element 364 and bumper 360 described above, may be mounted. For example, the bumper mount 804 includes a flange 808 that extends beyond an outer periphery of the beam 800 and provides space through which fasteners and/or other securement mechanisms may be applied to secure a crash element and/or bumper with the beam 800.

Figure 9:
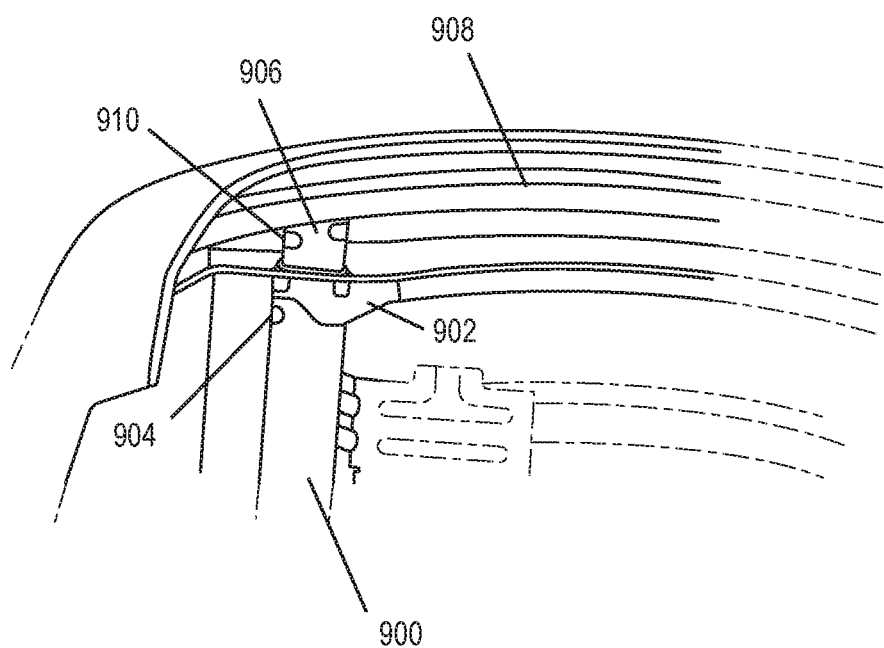
FIG. 9 depicts a bottom view of a rear impact system according to embodiments.

FIG. 9 shows another embodiment of a rear impact system of vehicle 100. Here, longitudinal beam 900 is shown having an irregular shape that matches a forward end of a bumper mount 902. Here, beam 900 includes one or more dimples 904 that are configured to encourage the beam 900 to crumple in an accordion-like manner as described elsewhere herein. Bumper mount 902 may define one or more apertures that are configured to receive fasteners for securing a crash element 906 with the bumper mount 902. Crash element 906 is largely similar to the crash element 364 described above, and may be used to couple the bumper mount 902 with a bumper 908. Here, crash element 906 includes dimples 910 that operate similar to other dimples described herein. While shown as a closed component, it will be appreciated that crash element 906 may have an open top or bottom surface and/or may define an open interior having a number of ribs that extend along one or more of the x, y, or z axis of the crash element 906.

Figure 10:
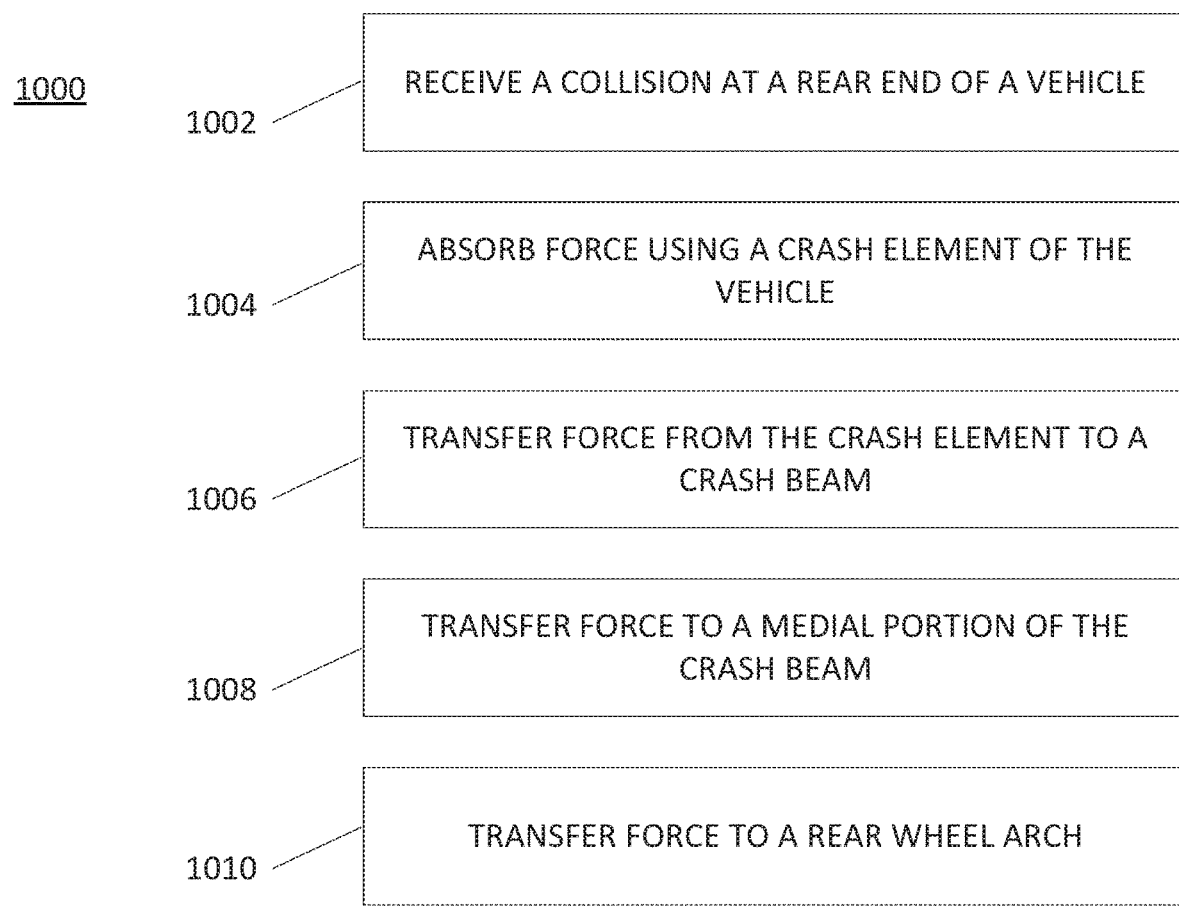
FIG. 10 is a flowchart depicting a method for absorbing a rear impact with an electric vehicle according to embodiments.

FIG. 10 is a flowchart depicting a process 1000 for absorbing a rear impact with an electric vehicle. Process 1000 may be performed using the electric vehicle 100 described herein. Process 1000 may begin at block 1002 by receiving a collision at a rear end of the electric vehicle. The impact may be received by a rear bumper or other rear component of the vehicle that is coupled with a longitudinal beam. At block 1004, force may be absorbed using a plurality of ribs of a rear crash element of the electric vehicle. The rear crash element may be coupled with the rear bumper and may define an interior comprising the plurality of ribs. Each of the ribs may extend between a front surface and a rear surface of the rear crash element, such as in a z-direction. The ribs, and possible dimples formed in the sides of the crash element, may help the crash element properly deform and transfer and absorb force. At block 1006, force may be transferred from a rear edge of the rear crash element to at least one crash beam that is coupled with a front edge of the rear crash element. The crash beam may be directly coupled with the crash element and/or may be coupled via a bumper mount positioned between the two components.

A force from the collision may be transferred from a rear edge of the at least one crash beam to a medial portion of the at least one crash beam at block 1008. The crash beam may be coupled with a rear portion of a chassis or rear wheel arch of the electric vehicle and may extend to the rear end of the electric vehicle. Process 1000 may also include absorbing at least a portion of the force from the collision with the outer walls and a number of ribs of the longitudinal beam. For example, as the force of the impact travels through the longitudinal beam, the force is absorbed by the additional material and thickness provided by the ribs. Any remaining forces may then be transferred to the rear end of the rear wheel arch or other component coupled with a front end of the longitudinal beam. The crash beam may be coupled with a rear portion of a rear wheel arch of the electric vehicle. At block 1010, any remaining portion of the force may be transferred to the rear end of the rear wheel arch.

Oftentimes, there will be a rear impact system positioned on either side of a trunk or motor compartment of the vehicle. This provides protection against impacts to both the left and right rear portions of the electric vehicle. In instances where an impact is received across an entire rear of the vehicle, both sides of the vehicle may absorb and transfer force from the impact as described in process 1000.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A rear impact system for an electric vehicle, the rear impact system comprising:
    a bumper extending laterally along a rear of the electric vehicle;
    a left rear crash element coupled proximate a left end of the bumper, wherein the left rear crash element defines a first interior comprising a first plurality of ribs extending between a first front surface and a first rear surface of the left rear crash element;
    a right rear crash element coupled proximate a right end of the bumper, wherein the right rear crash element defines a second interior comprising a second plurality of ribs extending between a second front surface and a second rear surface of the right rear crash element;
    a left bumper mount that couples the left rear crash element with the bumper;
    a right bumper mount that couples the right rear crash element with the bumper;
    a left crash beam having a first front end that is received within a left rear portion of a left rear wheel arch of the electric vehicle and a first rear end that is coupled with the left rear crash element of the electric vehicle, wherein the left rear crash element extends between a rear end of the left crash beam and the bumper, wherein the left crash beam has an octagonal cross-section; and
    a right crash beam having a second front end that is received within a right rear portion of a right rear wheel arch of the electric vehicle and a second rear end that is coupled with the right rear crash element of the electric vehicle, wherein the right rear crash element extends between a rear end of the right crash beam and the bumper, wherein the right crash beam has an irregular octagonal cross-section.

2. The rear impact system for an electric vehicle of claim 1, wherein:
    the plurality of ribs comprises:
        a first rib that extends from a medial portion of the front surface to a first end of the rear surface;
        a second rib that extends from the medial portion of the front surface to a second end of the rear surface; and
        a third rib that extends from the medial portion of the front surface to a medial portion of the rear surface.

3. The rear impact system for an electric vehicle of claim 2, wherein:
    each of the first rib, the second rib, and the third rib extends from a same position on the front surface of the rear crash element.

4. The rear impact system for an electric vehicle of claim 1, wherein:
    the plurality of ribs divides the interior of the rear crash element into triangular sections.

5. The rear impact system for an electric vehicle of claim 1, wherein:
    the rear crash element comprises a left surface and a right surface that couple the front surface with the rear surface.

6. The rear impact system for an electric vehicle of claim 5, wherein:
    the left surface extends from the front surface at a different angle than the right surface.

7. The rear impact system for an electric vehicle of claim 1, wherein:
    the first plurality of ribs and the second plurality of ribs extend vertically along a height of the respective rear crash element.

8. The rear impact system for an electric vehicle of claim 1, wherein:
    each of the left crash beam and the right crash beam define one or more dimples that extend into at least two sidewalls of the respective crash beam.

9. A rear impact system for an electric vehicle, the rear impact system comprising:
    a bumper extending laterally along a rear of the electric vehicle;
    a left rear crash element coupled proximate a left end of the bumper;
    a right rear crash element coupled proximate a right end of the bumper, wherein each of the left rear crash element and the right crash element comprises a left surface, a right surface, a front surface, and a rear surface that define an interior comprising a plurality of ribs extending between a front surface and a rear surface of the respective rear crash element, wherein the right surface and the left surface have different lengths;
    a left bumper mount that couples the left rear crash element with the bumper;
    a right bumper mount that couples the right rear crash element with the bumper;
    a left crash beam; and
    a right crash beam, wherein:
        each of the left crash beam and the right crash beam comprises a front end of each is received within a rear portion of a respective rear wheel arch of the electric vehicle and a rear end that is coupled with a respective one of the left rear crash element or the right crash element; and
        each of the left crash beam and the right crash beam has an irregular octagonal cross-section.

10. The rear impact system for an electric vehicle of claim 9, wherein:
    the plurality of ribs comprises:
        a first rib that extends from a medial portion of the front surface to a first end of the rear surface;
        a second rib that extends from the medial portion of the front surface to a second end of the rear surface; and
        a third rib that extends from the medial portion of the front surface to a medial portion of the rear surface.

11. The rear impact system for an electric vehicle of claim 9, wherein:
    the plurality of ribs divides the interior of the respective rear crash element into triangular sections.

12. The rear impact system for an electric vehicle of claim 9, wherein:

each of the left crash beam and the right crash beam defines a beam interior comprising an additional plurality of ribs extending in a longitudinal direction.

13. The rear impact system for an electric vehicle of claim 12, wherein:
each additional plurality of ribs comprises:
a vertical rib extending from a top wall of one of the crash beams to a bottom wall of the one of the crash beams; and
a horizontal rib extending from a first side wall of the one of the crash beams to a second side wall of the one of the crash beams.

14. The rear impact system for an electric vehicle of claim 9, wherein:
spaces defined by an area between outer walls of each of the left crash beam and the right crash beam and the plurality of ribs are pentagonal in shape.

15. A method of absorbing a rear impact with an electric vehicle, the method comprising:
receiving a collision at a bumper of the electric vehicle;
absorbing force using a plurality of ribs of each of a left rear crash element and a right rear crash element of the electric vehicle via bumper mounts coupled with each of the rear crash elements, wherein each of the left rear crash element and the right rear crash element defines an interior comprising the plurality of ribs, wherein each of the plurality of ribs extends between a front surface and a rear surface of the respective rear crash element;
transferring force from a rear edge of each respective rear crash element to at least one crash beam that is coupled with a front edge of each respective rear crash element, wherein the at least one crash beam comprises an irregular octagonal cross-section;
transferring a force from the collision from a rear edge of the at least one crash beam to a medial portion of the at least one crash beam, the at least one crash beam being received within a rear portion of a rear wheel arch of the electric vehicle and extending to the rear end of the electric vehicle; and
transferring any remaining portion of the force to the rear end of the rear wheel arch.

16. The method of absorbing a rear impact with an electric vehicle of claim 15, wherein:
the at least one crash beam defines an interior comprising an additional plurality of ribs extending in a crash direction from the rear edge through the medial portion to a front edge of the at least one crash beam; and
the method further comprises absorbing at least a portion of the force from the collision with the outer walls and the additional plurality of ribs of the at least one crash beam.

17. The method of absorbing a rear impact with an electric vehicle of claim 15, wherein:
the at least one crash beam is configured to crumple longitudinally when subjected to a rear impact to absorb a portion of force from the rear impact.

18. The method of absorbing a rear impact with an electric vehicle of claim 15, wherein:
the plurality of ribs comprises:
a first rib that extends from a medial portion of the front surface to a first end of the rear surface;
a second rib that extends from the medial portion of the front surface to a second end of the rear surface; and
a third rib that extends from the medial portion of the front surface to a medial portion of the rear surface.

19. The method of absorbing a rear impact with an electric vehicle of claim 15, wherein:
the plurality of ribs divides the interior of the rear crash element into triangular sections.

20. The method of absorbing a rear impact with an electric vehicle of claim 15, wherein:
the at least one crash beam comprises:
a top wall coupled with a first side wall by a first diagonal wall;
a bottom wall coupled with the first side wall by a second diagonal wall;
a second side wall coupled with the bottom wall by a third diagonal wall; and
a fourth diagonal wall that couples the second side wall with the top wall.

* * * * *